United States Patent [19]

Wright

[11] 4,237,736

[45] Dec. 9, 1980

[54] IMPACT GAUGE

[76] Inventor: John H. Wright, 2719 Tangy Ct., Apt. 3, Dayton, Ohio 45414

[21] Appl. No.: 58,880

[22] Filed: Jul. 19, 1979

[51] Int. Cl.³ ............................................. G01P 15/04
[52] U.S. Cl. ......................................... 73/492; 73/509
[58] Field of Search .................. 73/492, 509; 116/203; 346/7

[56] References Cited

U.S. PATENT DOCUMENTS

| | | |
|---|---|---|
| 2,475,728 | 7/1949 | Smith ............................... 116/203 X |
| 2,490,933 | 12/1949 | Tornquist . |
| 2,578,803 | 12/1951 | Holmberg . |
| 2,601,440 | 6/1952 | Kerrigan ............................ 116/203 |
| 2,614,430 | 10/1952 | Ballard . |
| 2,799,167 | 7/1957 | Loconti . |
| 2,976,732 | 3/1961 | Hautly . |
| 3,021,813 | 2/1962 | Rips . |
| 3,149,606 | 9/1964 | Falkner . |
| 3,312,188 | 4/1967 | Lode . |
| 3,369,521 | 2/1968 | Meeder . |
| 3,414,415 | 12/1968 | Broad . |
| 3,479,877 | 11/1969 | Allen . |
| 3,515,091 | 6/1970 | Smith . |
| 3,909,568 | 9/1975 | Greenhug . |
| 3,921,463 | 11/1975 | Robbins ............................ 116/203 X |
| 3,954,011 | 5/1976 | Manske . |
| 3,958,528 | 5/1976 | Hill . |
| 3,962,920 | 6/1976 | Manske .................................. 73/356 |
| 4,145,918 | 3/1979 | Couch ................................... 116/216 |
| 4,148,272 | 4/1979 | Wetzold ................................ 116/219 |

FOREIGN PATENT DOCUMENTS 652077  4/1951  United Kingdom .

Primary Examiner—James J. Gill
Attorney, Agent, or Firm—Biebel, French & Nauman

[57]  ABSTRACT

Upon impact, a ball is released and radially displaced into an annular space of decreasing thickness. Simultaneously, the ball releases a fluid to an absorbent material. The direction and distance of displacement indicate the direction and magnitude of the impact, and the subsequent migration of the fluid in the absorbent material indicates the elapsed time since the impact.

13 Claims, 4 Drawing Figures

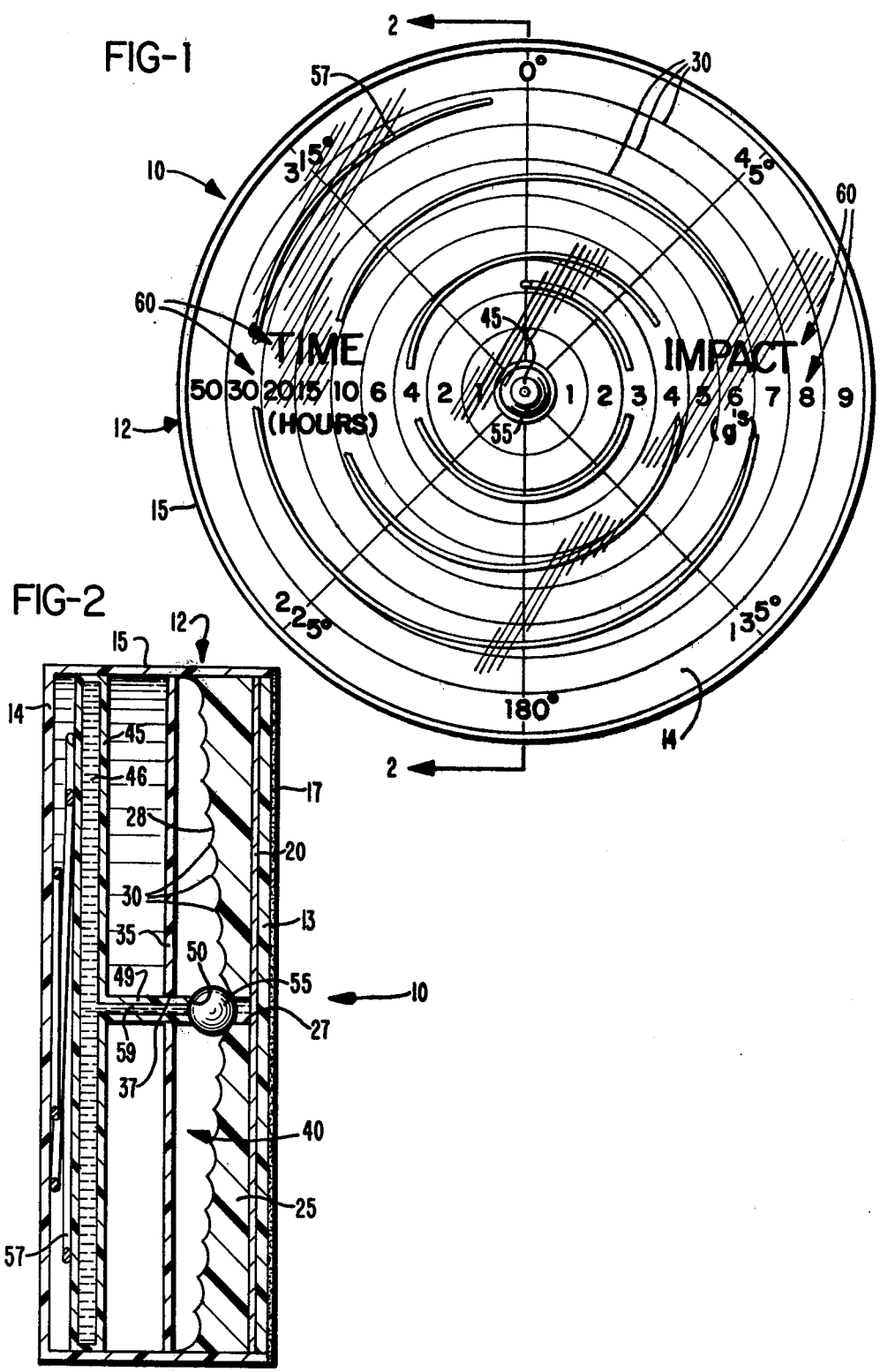

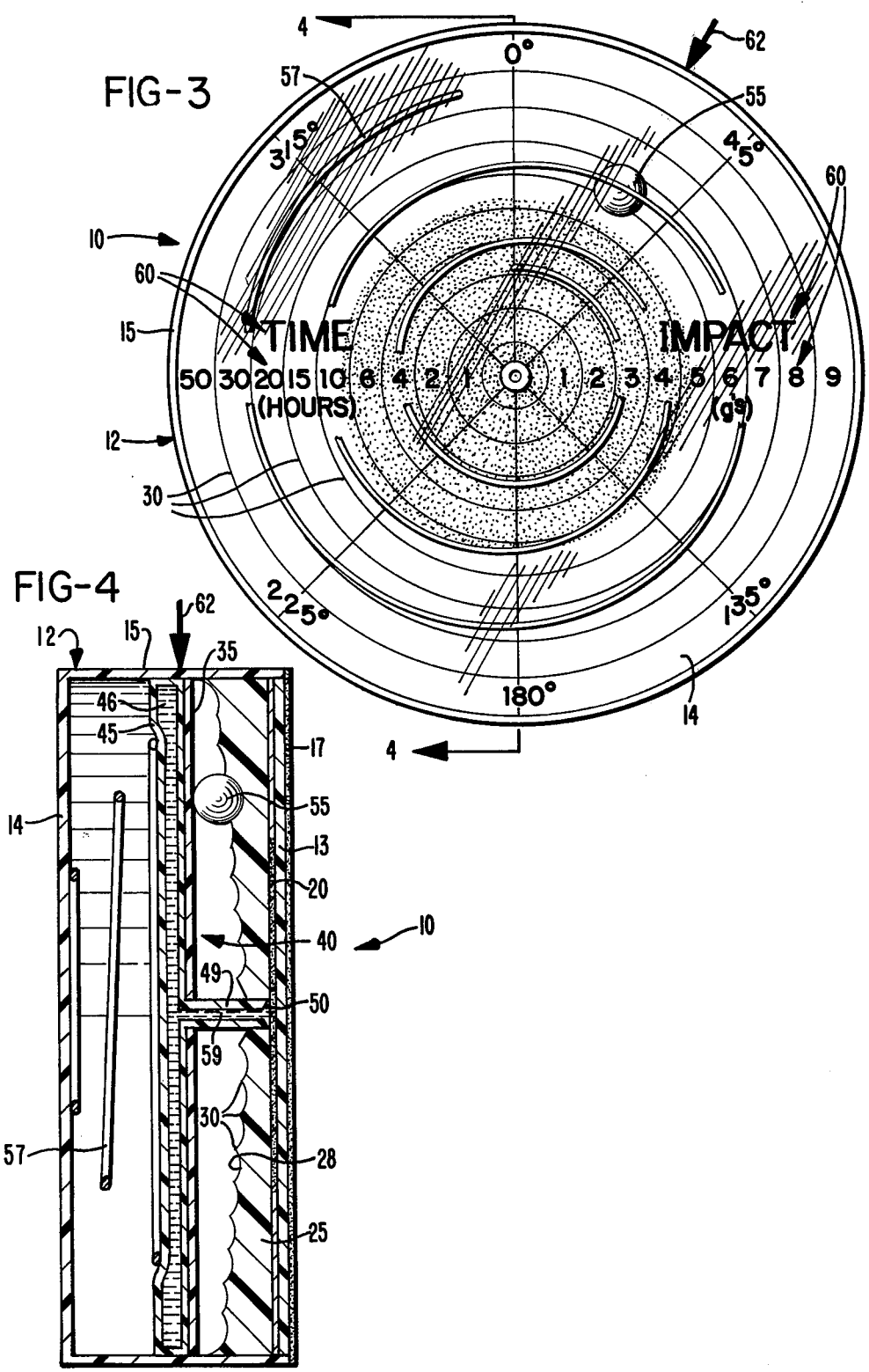

IMPACT GAUGE

BACKGROUND OF THE INVENTION

The present invention relates to impact gauges, and more particularly to a compact, inexpensive, and highly versatile gauge which may readily be attached to an object to indicate whether or not it has been subjected to an impact, and if so, to indicate the direction, magnitude, and time of the impact.

The prior art contains numerous examples of indicators for detecting excessive forces. Many of these are specifically designed for attachment to sensitive merchandise, for example, to highly sensitive scientific instruments, to show whether they might have been damaged by jarring or dropping. The majority of these detectors are intended for use when commodities are being shipped, to disclose rough handling during shipment.

Some of the prior art detectors show little more than that a predetermined maximum acceleration has been exceeded. Others will give an indication of the direction of the acceleration. At least one prior art device includes a strip recorder which gives a continuous time record of accelerations on all three axes. Unfortunately, however, as the capabilities of these indicators increase, so do there complexities, size, weight, and costs.

A need therefore remains for an inexpensive, uncomplicated, compact, durable, and reliable impact gauge which, in a single unit, will reliably indicate direction, magnitude, and time of impact, and which can easily be attached to any object for which such a record is desired.

SUMMARY OF THE INVENTION

Briefly, the present invention meets the above need and purposes. The preferred embodiment is shaped like a small disk, and, since it is also self-adhesive, it can readily be attached to any object for which an impact record is desired. A ball therein serves as an inertial member, and is retained on the seat of a valve by a biasing spring. Upon an unacceptable acceleration or impact, the ball is released and forced by the acceleration into an annular space of decreasing thickness. The thickness of the space and the resiliency of the material which define it are adjusted so that a predetermined g-force will be necessary to force the ball a given distance into the space. The higher the g-force, the farther the ball will penetrate. Convolutions or circular ridges on one of the walls of the space then capture or hold the ball, so that subsequent observation of the direction and displacement of the ball will indicate the single plane direction and magnitude of the impact or acceleration. Three such devices, on mutually perpendicular planes (XYZ) will indicate by trigonometric analysis the final resultant impact vector.

When the ball is dislodged from the valve seat, a compression spring moves the seat into contact with an absorbent material. The spring also compresses the fluid within a flexible topped piston connected to the valve seat, causing the fluid to flow into and migrate through the absorbent material. The rate at which the fluid flows through the material is a function of the wicking properties of the material and of the viscosity of the liquid. These are selected to be as slow or rapid as desired for the particular application at hand. Subsequent observation of the distance that the liquid has migrated will then reveal the length of time which has elapsed since the impact which originally displaced the ball. When used for shipment, for example, the time interval might extend up to several days or weeks, so that it would be possible to determine which carrier was responsible for the damaging impact.

It is therefore an object of the present invention to provide an improved impact gauge; an impact gauge which simultaneously provides an indication of direction, magnitude, and time of impact; which has an inertial member which is released when subjected to an acceleration above a predetermined level, and is displaced a distance and direction which are functions of the acceleration to which it was subjected; which simultaneously releases a liquid to an absorbent material to indicate the time which has lapsed since the acceleration as a function of the migration of the liquid through the absorbent material; a gauge in which the inertial member may itself be utilized for releasing the liquid; and to accomplish the above objects and purposes in an inexpensive, compact, efficient, versatile and reliable configuration readily suited to use in the widest variety of impact recording applications.

Other objects and advantages of the invention will be apparent from the following description, the accompanying drawings and the appended claims.

BRIEF DESCRIPTION OF THE DRAWINGS

FIG. 1 is a plan view of an impact gauge constructed according to the present invention;

FIG. 2 is a cross-sectional view of the impact gauge taken on line 2—2 of FIG. 1;

FIG. 3 is a view similar to FIG. 1 showing the impact gauge after an impact has been recorded; and FIG. 4 is a cross-sectional view taken on line 4—4 of FIG. 3.

DESCRIPTION OF THE PREFERRED EMBODIMENT

FIG. 1 illustrates a preferred embodiment of an impact gauge 10 constructed according to the present invention. Gauge 10 has an outer transparent housing 12 which is preferably hermetically sealed to stabilize the moisture conditions therein. Housing 12 is substantially cylindrical in shape, having a bottom side 13, a top side 14, and a cylindrical side 15 connecting the bottom and top sides 13 and 14. A self-adhesive coating 17 may be provided on the outside surface of bottom side 13 for attaching the impact gauge 10 to whatever device is to be monitored.

A layer 20 of absorbent material is attached to the inside surface of the bottom side 13 of housing 12 (FIG. 2). Absorbent material 20 may be any material suitable for receiving a liquid and permitting the liquid to migrate through the material. Examples include craft paper, blotter paper, porous ceramic material, and so on. The material 20 is selected, as more fully explained below, so that the liquid which is used in the impact gauge 10 will migrate thereacross in a time period appropriate for the use for which the particular impact gauge is intended.

Attached to absorbent material 20 on the side thereof opposite bottom side 13 of housing 10 is a layer 25 of substantially transparent resilient material (for example, a low friction material such as polystyrene or polyethylene). Layer 25 has a nozzle guide hole 27 in the center thereof which connects therethrough (FIG. 2) to the absorbent material 20.

As may be seen from the drawings (especially FIG. 2), the layer of resilient material 25 increases in thickness as a predetermined graduated function of the radial distance thereof from the nozzle guide hole 27. That is, the greater the radial distance from hole 27, the thicker the layer 25. Therefore, the surface 28 thereof on the side of layer 25 opposite the absorbent material 20 is conically or concavely dished. Further, for reasons explained below, surface 28 is provided with a series of circular ridges 30 which are concentric with the nozzle guide hole 27.

Facing and spaced from surface 28 of the resilient material layer 25 is a substantially transparent, flat, fixed partition 35 which has a nozzle receiving hole 37 therein opposite nozzle guide hole 27. Partition 35 is attached to and supported by the cylindrical side wall 15 of housing 12. The space within housing 12 between partition 35 and the material layer 25 thus constitutes an annular space 40, the thickness of which decreases as a graduated function of the radial distance thereof from the nozzle guide and nozzle receiving holes 27 and 37. The decreasing thickness of annular space 40 corresponds to the dished shaped of surface 28, and is a result of the corresponding increase in the thickness of layer 25.

On the side of the fixed partition 35 opposite annular space 40 is a substantially transparent, compressible piston 45 which is filled with a liquid 46 such as silicone oil or colored indicating fluid. Piston 45 is located within housing 12 such that it is movable toward the fixed partition 35 (as may be seen by comparing FIGS. 2 and 4). The walls of piston 45 are reasonably flexible, so that the piston can be compressed to pressurize the liquid 46 therein (as may be seen by comparing FIGS. 2 and 4 and noting the flexure of one of the piston walls in FIG. 4).

Piston 45 includes a nozzle 49 which extends therefrom through the nozzle receiving hole 37 in fixed partition 35. Nozzle 49 is in liquid communication with the liquid 46 inside piston 45, and the terminal portion thereof in annular space 40 is shaped to provide a seat 50 for a ball 55. A spring 57 is located within housing 12 between the top side 14 thereof and the side of piston 45 opposite nozzle 49. Spring 57 is thus biased against piston 45 to compress the piston and the liquid 46 therein and press the nozzle 49 toward the nozzle guide hole 27 and the absorbent material 20.

The ball 55 serves as an inertial member and is initially seated on the seat 50 and held between seat 50 and the nozzle guide hole 27 (FIG. 2) by the spring 57. The ball 55 and seat 50 act as a valve to keep the liquid 46 within piston 45 as long as ball 55 is held on seat 50. Ball 55, seat 50, and spring 57 are sized and adjusted to hold the ball in this position on seat 50 until the impact gauge 10 is subjected to an impact or acceleration above a predetermined level, such as 1 g. Seat 50 and spring 57 thus constitute a release means within housing 12 for holding ball 55 in its initial, predetermined position on seat 50 until subjected to this acceleration. Following release of ball 55, it will then be displaced by this acceleration to a new position (as may be seen by comparing FIGS. 1 and 3).

When ball 55 is released, this effectively opens the valve on the seat end of nozzle 49 and allows the compressed liquid 46 therein to begin to flow out of piston 45 through nozzle 49. In the absence of ball 55, the nozzle 49 and piston 45 are freed to move within housing 12. Nozzle 49 moves toward the absorbent material 20 and piston 45 moves toward the fixed partition 35, under the influence of spring 57. This causes nozzle 49 to move toward and enter the nozzle receiving hole 27, which in turn guides it to the layer of absorbent material 20. Seat 50 thereon seals against the absorbent material layer 20 to prevent the liquid from running thereacross. The bore 59 in the middle of nozzle 49, through which the liquid 46 flows, is preferably very small, having an ID, for example, of 0.0005"–0.010", to keep the liquid from squirting before seat 50 reaches the layer of absorbent material. Spring 57 continues to compress flexible piston 45 and the liquid 46 therein (FIG. 4) to assure a continued availability and flow of the liquid through the nozzle 40 to the absorbent material 20, so that the migration of the liquid through the material layer 20 will be a function of and indicate the time which has elapsed since ball 55 was released.

When ball 55 is released, the direction of its movement through the annular space 40 will be directly opposite to the direction of the acceleration, due to the inertia of ball 55. As ball 55 moves radially outwardly through annular space 40, however, it will be increasingly difficult for the ball to deform the resilient material layer 25 to provide sufficient room for the ball 55 to enter. This is the reason for the increasing thickness of the resilient material layer 25. In particular, the dimensions of the ball, the annular space 40, the resilient material layer 25, and the spacing of the fixed partition 35 therefrom, are selected so that the distance the ball can be displaced is a predetermined graduated function of the magnitude of the acceleration which displaced it. These parameters therefore, constitute a type of displacement control which limits the displacement of the ball 55 in this fashion.

The circular ridges 30 then capture and retain the ball 55 in the new position to which it is displaced by the accelerating force. In the preferred embodiment, the ridges 30 are spaced at intervals representing increasing increments of 1 g each, so that the magnitude of the acceleration in g's can be determined by counting the number of ridges which the ball successfully traversed before it was captured.

FIGS. 3 and 4 provide an illustration. For example, the top surface 14 of housing 12 is provided with indicators or indicia 60 in the form of scales, for readily interpreting the direction, magnitude, and elapsed time of the accelerating force. In FIGS. 1 and 2, the ball 55 is shown in its initial position. Piston 45 is located away from the fixed partition 35, and the liquid 46 is held therein by ball 55 in seat 50. In this condition the gauge 10 is then put into service, such as by attaching it to a shipping container or the goods therein. Upon receipt, the container is opened and the impact gauge examined. If it appears as shown in FIGS. 3 and 4, then the recipient can immediately determine that a force, illustrated by arrow 62, of 6 g's was received in the plane of the impact gauge by the package from an angle of 30 degrees approximately nine hours ago. That is, since impact gauge is essentially transparent, the migration of the liquid through the absorbent material can be seen through the scales 60 on the top surface 14. The liquid has migrated radially outwardly almost to the middle of the ten hour ring. The ball has been captured at the 30° position in the 6 g ring by the two ridges which define this ring. As may be seen in FIG. 4, the resilient material layer 25 in the vicinity of ball 55 has been compressed by the entry of the ball thereinto.

As may be seen, therefore, the present invention provides numerous advantages. It is extremely versatile, yet inexpensive, reliable, and very easy to use. It may be stored almost indefinitely. It can be adjusted, through suitable sizing and selection of materials, for any range of forces and time intervals. Three gauges can be applied on mutually perpendicular surfaces to ascertain the resultant acceleration vector, and the indicated times can be averaged for a more precise time determination. It can also be readily modified in other ways for meeting particular needs and applications without departing from the spirit and scope of the invention, such as by applying adhesive material to top side 14, reading the time through bottom side 13, and disassembling the device, for example, by detaching side 15 from to top side 14, to read the impact magnitude when using an opaque material, such as teflon or foamed plastics, for the resilient material 25. To provide another example, in critical applications, seat 50 of nozzle 49 could be formed of a metal at least as hard, and preferably harder, than ball 55, so that the seat 50 would not be grooved when ball 55 was released, thereby assuring a good seal of seat 50 against the absorbent material 20.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. An impact gauge, comprising:
   (a) a housing,
   (b) an inertial member within said housing,
   (c) release means in said housing for holding said inertial member in a predetermined position within said housing until subjected to an acceleration above a predetermined level, and then releasing said inertial member for displacement to a new position,
   (d) displacement control means for limiting said displacement of said inertial member as a graduated function of the magnitude and direction of the acceleration which displaced it,
   (e) retention means for retaining said inertial member in said new position to indicate the magnitude and direction of said acceleration,
   (f) a source of liquid in said housing connected to said release means,
   (g) an absorbent material in said housing separated from said source of liquid, and
   (h) said release means including means for simultaneously releasing liquid from said source of liquid to said absorbent material upon release of said inertial member, to commence migration of said liquid through said absorbent material for indicating elapsed time since said acceleration.

2. The gauge of claim 1 wherein said release means further comprises a nozzle connected for releasing the liquid to said absorbent material, a valve seat formed in said nozzle, and wherein said inertial member is a valve member seated in said valve seat when in said predetermined position to close said nozzle and prevent the liquid from reaching said absorbent material until said inertial member is displaced by said acceleration.

3. The gauge of claim 2 further comprising means for moving and holding said valve seat toward and against said absorbent material upon release of said inertial member to seal said nozzle to said absorbent material and prevent the liquid from running thereacross.

4. The gauge of claim 2 further comprising means for compressing said source of liquid to assure contact with and a continuing supply thereof to said absorbent material after release of said inertial member.

5. An impact gauge, comprising:
   (a) a housing,
   (b) an inertial member within said housing,
   (c) release means in said housing for holding said inertial member in a predetermined position within said housing until subjected to an acceleration above a predetermined level, and then releasing said inertial member for displacement to a new position,
   (d) displacement control means for limiting said displacement of said inertial member as a graduated function of the magnitude and direction of the acceleration which displaced it,
   (e) retention means for retaining said inertial member in said new position to indicate the magnitude and direction of said acceleration, and
   (f) said displacement control means comprising resilient space defining means within said housing defining an annular space having a thickness which decreases as a graduated function of the radial distance from said predetermined position, said inertial member being contained within said space, and said decreasing annular space providing increasing resistance to the entry thereinto of said inertial member as a function of the radial displacement thereof from said predetermined position.

6. The gauge of claim 1 or 5 wherein said inertial member is a metal ball and said release means includes a stop, and means forming a seat for said ball biased toward said stop to capture and hold said ball in said seat and against said stop.

7. The gauge of claim 6 wherein said space defining means further comprises a layer of resilient material extending radially outwardly from the vicinity of said seat and increasing in thickness as a graduated function of the radial distance from said seat, and a substantially flat, fixed surface opposite thereto, defining said space therebetween.

8. The impact gauge of claim 7 wherein said layer of resilient material is adjacent said one side of said housing, and said fixed surface defines a fixed partition within said housing.

9. The gauge of claim 7 wherein said retention means further comprises a series of circular ridges on said resilient material in said space and concentric with said seat, said ridges being spaced at intervals representing the predetermined g-forces necessary to overcome said resistance to cause said ball to enter thereinto, said ridges then capturing and retaining said ball when displaced to said new position to provide a subsequent indication of the magnitude and direction of the acceleration which displaced it.

10. An impact gauge, comprising:
   (a) a substantially transparent housing,
   (b) a layer of absorbent material within said housing on one side thereof,
   (c) a layer of substantially transparent resilient material within said housing on the other side of said layer of absorbent material, said layer of resilient material having a nozzle guide hole in the center thereof and increasing in thickness as a predetermined graduated function of the radial distance from said nozzle guide hole, (d) a substantially transparent, flat, fixed partition, having a nozzle receiving hole therein opposite said nozzle guide hole, and being positioned within said housing and spaced from said layer of resilient material to define an annular space therebetween, the thickness of which decreases as a predetermined graduated function of the radial distance thereof from said nozzle guide and nozzle receiving holes as a result of the corresponding increase in the thickness of said layer of resilient material, (e) a substantially transparent, compressible, liquid filled piston located in and movable within said housing toward the side of said fixed partition opposite said annular space, (f) a nozzle on said piston in communication with said liquid therein and positioned through said nozzle receiving hole into said annular space, (g) seat means defining a ball receiving seat on the end of said nozzle in said annular space, (h) a spring within said housing biased against the side of said piston opposite said nozzle to compress said piston and press said nozzle toward said nozzle guide hole and said absorbent material, (i) a ball within said annular space initially seated on said seat and held between said seat and said nozzle guide hole by said spring, said ball and seat being sized and shaped to act as a valve to keep said liquid within said piston as long as said ball is held on said seat, and said ball, seat, and spring being sized and adjusted to hold said ball in position on said seat until subjected to an acceleration above a predetermined level, and then to release said ball into said annular space for displacement to a new position, and said spring and piston being sized and shaped to move said piston and nozzle toward said fixed partition and said absorbent material when said ball is released to cause said nozzle to enter said nozzle guide hole and seat against said absorbent material, and said spring being adjusted to continue to compress said piston and liquid therein to cause said liquid to flow through said nozzle into said absorbent material for migration therethrough as a function of elapsed time, and (j) a series of circular ridges on said resilient material in said annular space and concentric with said nozzle guide hole, said ridges being spaced at intervals representing the predetermined g-forces necessary to overcome the increasing resistance to entry thereinto of said ball caused by the corresponding decreasing thickness of said annular space, said ridges being sized and shaped to capture and retain said ball when displaced to said new position to provide a subsequent indication of the magnitude and direction of the acceleration which displaced it.

11. The gauge of claim 10 further comprising indicating indicia in association with said layer of resilient material and said layer of absorbent material for providing, respectively, an indication of the magnitude and direction of the displacing acceleration as a function of the new position of said ball, and the elapsed time since the acceleration as a function of the distance said liquid has migrated through said absorbent material.

12. A method of recording an acceleration, comprising:

(a) releasing an inertial member when the acceleration occurs for displacement to a new position in response to the acceleration, (b) controlling the displacement of the inertial member to the new position as a predetermined graduated function of the magnitude and direction of the acceleration, (c) retaining the inertial member in the new position to indicate the magnitude and direction of the acceleration, and (d) simultaneously releasing liquid to an absorbent material when the inertial member is released to commence migration of the liquid through the absorbent material for indicating elapsed time since the acceleration.

13. The method of claim 12 further comprising using the inertial member to release the liquid.

* * * * *